United States Patent
Kim et al.

(10) Patent No.: US 8,325,054 B2
(45) Date of Patent: Dec. 4, 2012

(54) HOME APPLIANCE AND SIGNAL OUTPUT METHOD THEREOF

(75) Inventors: Yongtae Kim, Changwon-si (KR); Euihyeok Kwon, Changwon-si (KR); Koonseok Lee, Changwon-si (KR); Hyunsang Kim, Changwon-si (KR); Haeyong Kang, Changwon-si (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 12/842,679

(22) Filed: Jul. 23, 2010

(65) Prior Publication Data

US 2011/0018729 A1    Jan. 27, 2011

(30) Foreign Application Priority Data

Jul. 24, 2009 (KR) .................. 10-2009-0067907

(51) Int. Cl.
*G08B 21/00* (2006.01)
(52) U.S. Cl. .... 340/679; 340/5.71; 340/538; 340/539.1; 340/635; 340/637; 340/654; 340/661; 340/664
(58) Field of Classification Search ................. 340/679, 340/5.71, 538, 539.1, 635, 637, 654, 661, 340/664
See application file for complete search history.

(56) References Cited

U.S. PATENT DOCUMENTS

| | | | |
|---|---|---|---|
| 3,910,322 A | 10/1975 | Hardesty et al. | |
| 4,766,505 A | 8/1988 | Nakano et al. | |
| 4,897,659 A | 1/1990 | Mellon | |
| 5,103,214 A | 4/1992 | Curran et al. | |
| 5,268,666 A | 12/1993 | Michel et al. | |
| 5,452,344 A | 9/1995 | Larson | |
| 5,506,892 A | 4/1996 | Kojima et al. | |
| 5,757,643 A | 5/1998 | Kuroda et al. | |
| 5,774,529 A | 6/1998 | Johannsen et al. | |
| 5,864,828 A | 1/1999 | Atkins | |
| 5,940,915 A | 8/1999 | Nam ................................ 8/159 |
| 5,987,105 A | 11/1999 | Jenkins et al. | |
| 6,121,593 A | 9/2000 | Mansbery et al. | |
| 6,763,458 B1 | 7/2004 | Watanabe et al. ............. 713/100 |
| 6,778,868 B2 | 8/2004 | Imamura et al. | |
| 6,870,480 B2 | 3/2005 | Suzuki et al. | |
| 6,906,617 B1 * | 6/2005 | Van der Meulen ........... 340/538 |

(Continued)

FOREIGN PATENT DOCUMENTS

EP         0 038 687        10/1981

(Continued)

OTHER PUBLICATIONS

PCT International Search Report dated May 26, 2011 issued in Application No. PCT/KR2010/005108.

(Continued)

*Primary Examiner* — Tai T Nguyen
(74) *Attorney, Agent, or Firm* — Ked & Associates LLP (57) ABSTRACT

A home appliance and a signal output method thereof are disclosed. The home appliance outputs product information in the form of a sound signal, which is transmitted to a service center at a remote site over a communication network so that the service center can readily check the state of the home appliance. A digital signal including product information of the home appliance is converted into a sound signal based on a plurality of frequency signals. Therefore, a larger amount of data can be rapidly transmitted for a fault diagnosis, so as to improve fault diagnosis accuracy.

9 Claims, 6 Drawing Sheets

U.S. PATENT DOCUMENTS

| | | | |
|---|---|---|---|
| 7,135,982 B2 | 11/2006 | Lee | 340/635 |
| 7,266,164 B2 | 9/2007 | Jeon et al. | |
| 7,280,643 B2 | 10/2007 | Howard et al. | 379/93.37 |
| 7,337,457 B2 | 2/2008 | Pack et al. | 725/40 |
| 7,439,439 B2 | 10/2008 | Hayes et al. | 84/600 |
| 7,509,824 B2 | 3/2009 | Park et al. | 68/12.23 |
| 7,648,476 B2 | 1/2010 | Bock et al. | |
| 7,653,512 B2 | 1/2010 | Cheung et al. | 702/184 |
| 7,965,632 B2 | 6/2011 | Sugaya | |
| 8,027,752 B2 | 9/2011 | Castaldo et al. | |
| 8,040,234 B2 | 10/2011 | Ebrom et al. | 340/531 |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 2002/0078742 A1 | 6/2002 | Kim | 73/162 |
| 2002/0116959 A1 | 8/2002 | Ohta et al. | |
| 2003/0196492 A1 | 10/2003 | Remboski et al. | 73/593 |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0249903 A1* | 12/2004 | Ha et al. | 709/208 |
| 2005/0086979 A1 | 4/2005 | Son et al. | |
| 2005/0129200 A1 | 6/2005 | Forrest et al. | 379/93.37 |
| 2005/0134472 A1 | 6/2005 | Jang et al. | |
| 2006/0066758 A1 | 3/2006 | Higashihara | |
| 2006/0136544 A1 | 6/2006 | Atsmon et al. | |
| 2006/0259199 A1 | 11/2006 | Gjerde et al. | |
| 2007/0189323 A1 | 8/2007 | Swoboda et al. | |
| 2008/0036619 A1 | 2/2008 | Rhodes et al. | |
| 2008/0122648 A1 | 5/2008 | Ebrom et al. | |
| 2009/0160637 A1* | 6/2009 | Maeng | 340/539.1 |
| 2009/0323914 A1 | 12/2009 | Lee et al. | |
| 2010/0116060 A1 | 5/2010 | Murayama | 73/593 |
| 2011/0200189 A1 | 8/2011 | True et al. | |

FOREIGN PATENT DOCUMENTS

| | | |
|---|---|---|
| EP | 0 510 519 A1 | 10/1992 |
| EP | 0 617 557 A2 | 9/1994 |
| EP | 0 691 060 B1 | 1/1996 |
| EP | 0 742 308 | 11/1996 |
| EP | 0 846 991 | 6/1998 |
| EP | 0 851 054 | 7/1998 |
| JP | 4-358497 A | 12/1992 |
| JP | 2001-353395 A | 12/2001 |
| JP | 2002-000988 A | 1/2002 |
| JP | 2002-011274 A | 1/2002 |
| JP | 2002-045590 A | 2/2002 |
| JP | 2007-267956 A | 10/2007 |
| JP | 2008-003562 A | 1/2008 |
| KR | 10-1991-0020404 A | 12/1991 |
| KR | 10-1996-003308 A | 1/1996 |
| KR | 10-1996-0003308 A | 1/1996 |
| KR | 10-1997-019443 A | 4/1997 |
| KR | 20-1999-0040564 U | 12/1999 |
| KR | 10-2000-0018678 A | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-2004-0050767 | 6/2004 |
| KR | 10-2004-0095017 | 11/2004 |
| KR | 10-2005-0062747 A | 6/2005 |
| KR | 10-2005-0097282 A | 10/2005 |
| KR | 10-0564761 B1 | 3/2006 |
| KR | 10-2006-0103014 | 9/2006 |
| KR | 10-2007-0013090 A | 1/2007 |
| KR | 10-2008-0068447 | 7/2008 |
| KR | 10-2010-0112950 | 10/2010 |
| KR | 10-2011-0010378 | 2/2011 |
| WO | WO 2008/010670 | 1/2008 |

OTHER PUBLICATIONS

International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
PCT International Search Report dated Aug. 23, 2010 issued in Application No. PCT/KR2010/000319.
International Search Report dated Dec. 1, 2010 (PCT/KR2010/002211).
International Search Report dated Dec. 1, 2010 (PCT/KR2010/002222).
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
European Search Report dated Oct. 14, 2011 issued in Application No. 09 73 8950.
International Search Report dated Apr. 25, 2011 issued in Application No. PCT/KR2010/004407.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
U.S. Appl. No. 12/431,893, filed Apr. 29, 2009.
U.S. Appl. No. 12/431,903, filed Apr. 29, 2009.
U.S. Appl. No. 12/431,910, filed Apr. 29, 2009.
U.S. Appl. No. 12/432,111, filed Apr. 29, 2009.
U.S. Appl. No. 12/432,132, filed Apr. 29, 2009.
U.S. Appl. No. 12/551,827, filed Sep. 1, 2009.
U.S. Appl. No. 12/757,339, filed Apr. 9, 2010.
U.S. Appl. No. 12/568,022, filed Sep. 28, 2009.
U.S. Appl. No. 12/757,205, filed Apr. 9, 2010.
U.S. Appl. No. 12/757,213, filed Apr. 9, 2010.
U.S. Appl. No. 12/757,232, filed Apr. 9, 2010.
U.S. Appl. No. 12/757,246, filed Apr. 9, 2010.
U.S. Appl. No. 12/603,810, filed Oct. 22, 2009.
U.S. Appl. No. 12/432,184, filed Apr. 29, 2009.
U.S. Appl. No. 13/382,334, filed Jan. 5, 2012.
U.S. Appl. No. 12/842,649, filed Jul. 23, 2010.
U.S. Appl. No. 12/846,013, filed Jul. 29, 2010.
U.S. Appl. No. 12/846,040, filed Jul. 29, 2010.
U.S. Appl. No. 12/847,272, filed Jul. 30, 2010.
U.S. Appl. No. 12/847,303, filed Jul. 30, 2010.
U.S. Appl. No. 12/847,406, filed Jul. 30, 2010.
U.S. Appl. No. 12/847,284, filed Jul. 30, 2010.
U.S. Appl. No. 12/847,306, filed Jul. 30, 2010.
U.S. Appl. No. 12/850,240, filed Aug. 4, 2010.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.

U.S. Office Action issued in U.S. Appl. No. 12/603,810 dated Jul. 5, 2012.
U.S. Office Action issued in U.S. Appl. No. 12/431,910 dated Jul. 23, 2012.
U.S. Office Action issued in U.S. Appl. No. 12/431,893 dated Jul. 31, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Korean Office Action dated Aug. 13, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.

* cited by examiner

HOME APPLIANCE AND SIGNAL OUTPUT METHOD THEREOF

CROSS-REFERENCE TO RELATED APPLICATION

This application claims the priority benefit of Korean Patent Application No. 10-2009-0067907, filed on Jul. 24, 2009 in the Korean Intellectual Property Office, the disclosure of which is incorporated herein by reference.

BACKGROUND OF THE INVENTION

1. Field of the Invention

The present invention relates to a home appliance and a signal output method thereof, and more particularly to a home appliance and a signal output method thereof in which product information of the home appliance is output in the form of a predetermined sound signal to facilitate state inspection and after-sale service for the home appliance.

2. Description of the Related Art

In operation, a home appliance stores values set for execution of the operation, information generated during the operation, fault information, etc. Particularly, in the event of a fault, the home appliance outputs a predetermined alarm, thereby enabling the user to recognize the state of the home appliance. The home appliance may output detailed fault information through its output device, for example, a display device or lamp, as well as simply notifying the user of completion of an operation or occurrence of a fault.

On the other hand, in the event of a fault in the home appliance, the user may utilize an after-sale service of calling a service center to ask advice on the state of the home appliance or request a service technician for the home appliance.

In this case, the home appliance generally outputs fault information simply or as a code value that cannot be understood by the user. For this reason, the user may have difficulty in coping with the fault in the home appliance and in accurately communicating the state of the home appliance to the service center even though contacting the service center. Consequently, when a service technician visits the user's home, a lot of time and cost may be taken for the service technician to repair the home appliance due to lack of accurate prior knowledge as to the state of the home appliance. For example, provided that a part required for repair of the home appliance is not prepared in advance, the service technician will have the inconvenience of re-visiting the user's home, resulting in an increase in repair time.

In order to solve the above problem, the home appliance may be connected to a server of the service center via a communication unit. However, in this case, it is necessary to construct a communication network.

With technological development, a fault may be remotely diagnosed over a telephone network. European Patent No. 0510519 discloses a technique for transmitting fault information of a home appliance to a service center via a modem connected to the home appliance over a telephone network. However, this technique requires continuous connection of the modem to the home appliance. Particularly, in the case where the home appliance is a laundry treatment machine that is usually installed outdoors, a spatial restriction may be imposed on connecting the laundry treatment machine to the telephone network.

U.S. Pat. No. 5,987,105 discloses a technique for converting fault information of a home appliance into a sound signal of an audible frequency band and transmitting the sound signal to a service center over a telephone using a telephone network. Signal interference may occur depending on an ambient environment in the course of converting the fault information of the home appliance into the sound signal of the audible frequency band and then transmitting the sound signal to a receiver of the telephone. In addition, data may be lost according to characteristics of the telephone network during the transmission of the sound signal over the telephone network.

In the '105 patent, in order to prevent data loss and deliver accurate product information, the size of one symbol representing one information unit, 1 bit, is defined as 30 ms and an independent frequency is used for each bit.

To minimize an interval at which the same frequency is repeated, as many frequencies as data are needed. For example, seven different frequencies may be required to represent seven data. As a consequence, more frequencies than needed are used.

The number of frequencies used may be reduced by increasing a symbol time. This means that the symbol time increases from 30 ms to 100 ms or longer. The resulting increase in size of transmission data leads to the increase of transmission time.

Accordingly, there exists a need to develop a scheme for representing product information in a smaller number of frequencies, reducing the size and transmission time of the product information using a shorter symbol time, and increasing accuracy for the short symbol time.

However, in order to allow the home appliance to output information using a sound signal and transmit the sound signal to the service center over the telephone network and allow the service center to diagnose the state and fault of the home appliance through analysis of the sound signal, as much data as required for the diagnosis must be included in the sound signal, but there is a limitation in the amount of data to be included in the sound signal.

Moreover, when a sound signal to be output includes a large amount of data, the length of the sound signal increases in proportion to the data amount and the number of errors to occur in a process of transmitting the sound signal increases accordingly, thereby increasing a transmission time, a wait time and a processing time.

SUMMARY OF THE INVENTION

Therefore, the present invention has been made in view of the above problems, and it is an object of the present invention to provide a home appliance and a signal output method thereof in which product information of the home appliance is output in the form of a sound signal based on a combination of a plurality of frequencies so that it can be readily delivered.

In accordance with an aspect of the present invention, the above and other objects can be accomplished by the provision of a home appliance including a selector for inputting a command for execution of a fault diagnosis of the home appliance, a memory for storing product information of the home appliance for the fault diagnosis, a controller for, when the fault diagnosis execution command is input by the selector, changing an operating mode of the home appliance to a smart diagnosis mode and encoding the product information stored in the memory to generate a digital signal including at least one frame, a modulator for modulating the digital signal using a plurality of frequencies such that any one of signals of the frequencies corresponds to at least one bit of the digital signal, and a sound output device for outputting a sound signal corresponding to the frequency signals applied from the modulator.

In accordance with another aspect of the present invention, there is provided a signal output method of a home appliance including encoding pre-stored product information to generate a digital signal of a predetermined format, upon entry of a smart diagnosis mode, setting the number of bits of the digital signal corresponding to one frequency signal according to the number of available frequencies, generating any one of a plurality of frequency signals corresponding to a logic value of the digital signal according to the setting to convert the digital signal into a combination of the frequency signals, and outputting a sound signal corresponding to the frequency signals through a sound output device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
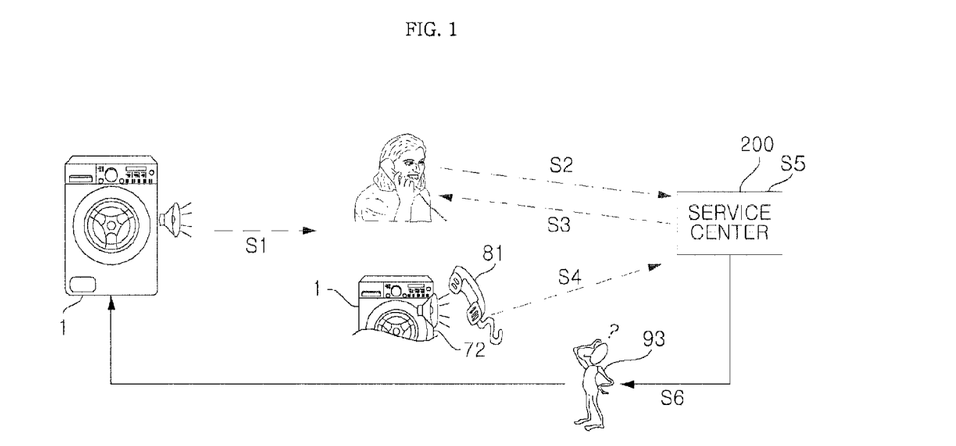
FIG. 1 is a schematic view showing the configuration of a home appliance diagnostic system according to an embodiment of the present invention.

FIG. 1 is a schematic view showing the configuration of a home appliance diagnostic system according to an embodiment of the present invention. Referring to FIG. 1, a home appliance of the present invention may be included in the diagnostic system to undergo a diagnosis of the state and fault thereof from a service center in the diagnostic system. The service center includes a diagnostic server having information about the home appliance and a diagnosis program.

The home appliance diagnostic system is configured in such a manner that, when a home appliance 101 in each home outputs information about the operation thereof in the form of a sound signal, the sound signal, which includes product information, is transmitted to a service center 200 over a telephone network so that the service center 200 may diagnose the state of the home appliance 101 to determine whether the home appliance 101 is out of order.

The home appliance 101 includes a display device for displaying predetermined data. The display device is a light emitter such as a light emitting diode (LED), a liquid crystal display (LCD) or an organic electro-luminescent (EL) display, and visually displays state information or fault information of the home appliance 101. The home appliance 101 further includes a sound output device for outputting a sound signal. The sound output device reproduces and outputs information about the operation, state or fault of the home appliance 101 as a predetermined sound signal.

When the home appliance 101 malfunctions or operates abnormally, it notifies the user of occurrence of a fault through the display device or sound output device (S1).

The user confirms product information of the home appliance 101 displayed on the display device of the home appliance 101 and then controls the operation of the home appliance 101 or requests repair of the home appliance 101 from the service center 200. At this time, the user may contact the service center 200 to notify the service center 200 that a fault has occurred in the home appliance 101 and ask advice on the fault (S2).

In the case where the user connects to the service center 200 and manipulates a selector of an input device in the home appliance 101 in response to a request from the service center 200 (S3), the home appliance 101 does not output the product information simply, but converts the product information into a predetermined sound signal and outputs the sound signal through the sound output device. The sound signal including the product information, output in this manner, is transmitted to the service center 200 over a communication network (S4).

At this time, the user may notify the service center 200 of model information and fault symptoms of the home appliance 101 and place a portable terminal 81 close to a sounding portion of the home appliance 101, that is, the sound output device during the call with the service center 200 to transmit the sound signal including the product information of the home appliance 101 to the service center 200. In this manner, the user may transmit the sound signal including the product information of the home appliance 101 to the service center 200 using his/her telephone or mobile phone to request an after-sale service (A/S) for the home appliance 101.

The service center 200 receives the sound signal output from the home appliance 101 over a communication network connected thereto, for example, a telephone network, and checks the product state of the home appliance 101 based on the received sound signal to diagnose whether the home appliance 101 is out of order (S5).

Based on a result of the diagnosis, the service center 200 dispatches a service technician 93 to the user's home to provide a service suitable for the product state and fault diagnosis of the home appliance 101 (S6). In step S6, the diagnosis result may be transmitted to a terminal of the service technician 93 so that he/she may fix the home appliance 101. As needed, the service center 200 may connect with the user through the communication network to provide the diagnosis result to the user in the form of a voice through a customer service agent or in the form of predetermined data (S7). Also, the diagnosis result may be transmitted to the user's email address or mobile phone.

Therefore, when the user connects to the service center 200 through a communication network, for example, a telephone network, the diagnostic system can accurately determine and cope with the state of the home appliance 101 based on a sound signal, thereby providing a rapid service.

Although the home appliance 101 of the present invention will hereinafter be described for illustrative purposes as being a laundry treatment machine, the present invention is not limited thereto. Rather, it is to be clearly understood that the present invention is applicable to all home appliances including TVs, air conditioners, washing machines, refrigerators, electric rice cookers, and microwave ovens.

Figure 2:
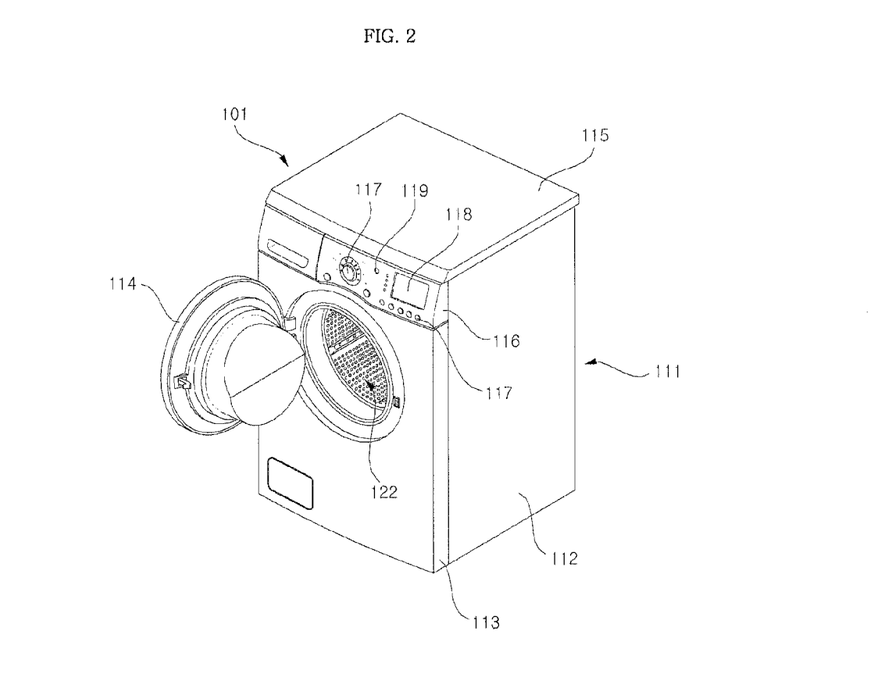
FIG. 2 is a perspective view showing the configuration of a home appliance according to an embodiment of the present invention.

The home appliance 101 is configured as described below to output product information in the form of a predetermined sound signal. FIG. 2 is a perspective view showing the configuration of a home appliance according to an embodiment of the present invention. A description will hereinafter be given of a laundry treatment machine as an example of the home appliance.

Referring to FIG. 2, the laundry treatment machine 101, which is the home appliance of the present invention, includes a cabinet 111, a tub 122 disposed inside the cabinet 111 for washing laundry, a motor (not shown) for driving the tub 122, a wash water supply (not shown) for supplying wash water to the tub 122, and a drainage device (not shown) for draining the wash water externally after the laundry is washed.

The cabinet 111 includes a cabinet body 112, a cabinet cover 113 coupled to a front side of the cabinet body 112, a control panel 116 disposed over the cabinet cover 113 for controlling the operation of the laundry treatment machine 101, and a top plate 115 disposed over the control panel 116 and coupled to the cabinet body 112. The cabinet cover 113 includes a hole (not shown) for putting in or taking out the laundry therethrough, and a door 114 for pivotally moving to open/close the hole.

The control panel 116 is provided with an input device including a manipulator 117 having a plurality of manipulating keys for manipulating the laundry treatment machine 101, a sound output device 160 for outputting a sound signal indicative of the operating state of the laundry treatment machine 101, and a display device 118 for displaying the operating state of the laundry treatment machine 101 in the form of text, a numeral, a special symbol, an image, or the like. In the input device, the manipulator 117 may be configured with an input unit for applying a certain signal by push, contact, pressure, rotation, or the like, such as a key, a button, a switch, a rotary switch, or a touch input unit.

When the user pushes the selector, included in the input device, the laundry treatment machine 101 receives a smart diagnosis mode entry command and a signal output command, converts product information into a digital signal of a predetermined format and applies the digital signal to the sound output device 160. As the sound output device 160 operates in response to the digital signal, it outputs a predetermined sound signal.

The sound output device 160 is provided at a rear side of the control panel 116 to output a sound signal from the inside of the control panel 116. The sound output device 160 is spaced apart from the manipulator 117, a selector 130 or a sound output hole 119 by a predetermined distance so that it can be protected from water or foreign substances incoming from the outside.

The sound signal output from the sound output device 160 is externally emitted through cracks of portions of the control panel 116, in which keys of the manipulator 117 or selector 130 are formed, along a sound path or sound guide portion formed at the rear side of the control panel 116. Alternatively, in the case where the separate sound output hole 119 is provided, the sound signal output from the sound output device 160 may be externally emitted through the sound output hole 119.

Here, it is preferable that the keys of the manipulator 117 or selector 130 be constructed so as to enlarge the gap between the control panel 116 and each of the keys or to permit an internal sound to be emitted externally when pressed.

The sound output device 160 may include at least one sound output device. For example, in the case where the sound output device 160 includes two sound output devices, one of the sound output devices may output a sound signal of a combination of predetermined frequencies including product information of the home appliance and the other may output an effect sound or alarm sound of the home appliance and an indication sound indicative of the start or end of the output of the sound signal including the product information.

The sound signal output from the sound output device 160 is transmitted to the service center 200 through the portable terminal 81, connected to a communication network. Here, the communication network may be, for example, a telephone network or mobile network, and the portable terminal 81 may be, for example, a telephone or mobile phone.

The service center 200, which includes the diagnostic server, receives the sound signal output from the laundry treatment machine 101 and analyzes the received sound signal, so as to acquire operation information and fault information of the laundry treatment machine 101. As a result, the service center 200 transmits a countermeasure against a faulty operation of the laundry treatment machine 101 to the user or dispatches a service technician to the user's home.

Figure 3:
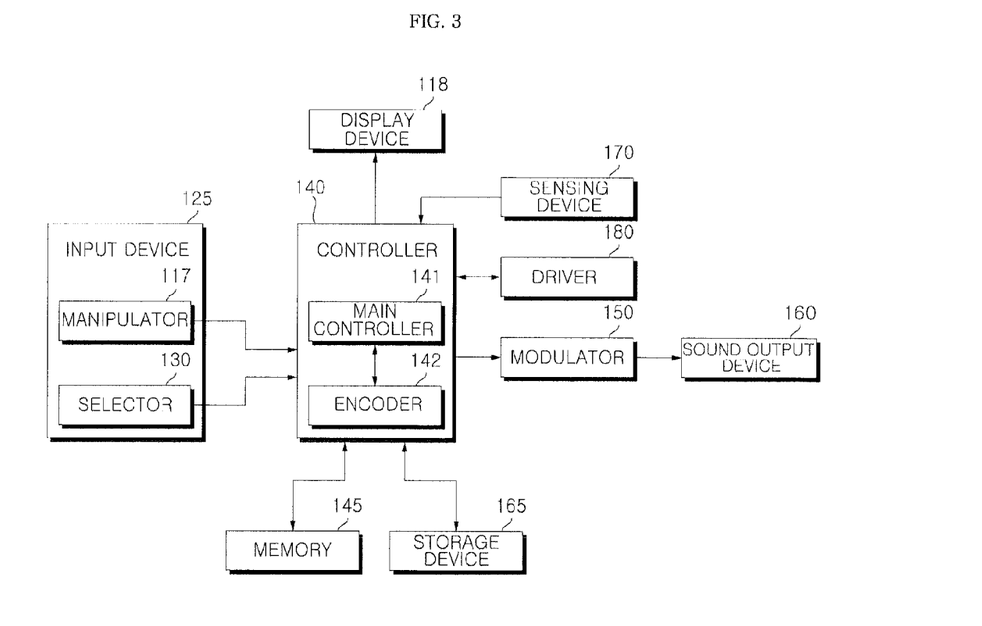
FIG. 3 is a block diagram showing a configuration for control of a home appliance according to an embodiment of the present invention.

FIG. 3 is a block diagram showing a configuration for control of a home appliance according to an embodiment of the present invention.

The home appliance 101, configured as stated above with reference to FIG. 2, has a control configuration for performing a washing mode, a rinsing mode, a spin-drying mode, etc. for laundry within the home appliance 101, processing data generated during the operation of the home appliance 101, and, when a smart diagnosis mode is set based on an input of a selector, generating product information including data of the home appliance 101 in the form of a digital signal of a predetermined format and outputting a predetermined sound signal based on the digital signal.

Referring to FIG. 3, the home appliance 101 includes an input device 125, a sensing device 170, a memory 145, a storage device 146, a driver 180, a modulator 150, the sound output device 160, and a controller 140 for controlling the entire operation of the home appliance 101.

The input device 125 is provided with at least one input unit for inputting a predetermined signal or data to the home appliance 101 according to a user manipulation. The input device 125 includes the manipulator 117 and the selector 130.

The selector 130 has at least one input unit. Upon selection of the smart diagnosis mode, the selector 130 applies a signal output command to the controller 140 so that product information is output in the form of a predetermined sound signal through the sound output device 160.

The selector 130 may be provided with input units separate from those of the manipulator 117. Alternatively, the manipulator 117 may include two or more manipulating keys that may operate or be recognized as the selector when manipulated simultaneously.

As the smart diagnosis mode is entered, the selector 130 turns on/off the sound output device 160. That is, when the signal output command is input by the selector 130, product information is output in the form of a predetermined sound signal in response to a digital signal from the controller 140. At this time, the sound output device 160 operates to output the sound signal.

The manipulator 117 receives data such as an operation course or operation setting according to the operation of the home appliance 101 and applies the received data to the controller 140. The manipulator 117 also receives settings related to sound signal output. That is, the manipulator 117 receives values for setting a sound signal output method, the level of a sound signal to be output, etc.

The input device 125 including the selector 130 and the manipulator 117 may be configured to include buttons, a dome switch, a touch pad (static pressure/capacitance), a jog wheel, a jog switch, a finger mouse, a rotary switch, a jog dial, or the like. Any device may serve as the input device 125 so long as it generates predetermined input data by a manipulation such as push, rotation, pressure or contact.

The sensing device 170 includes at least one sensor for sensing a temperature, a pressure, a voltage, current, the level of water, the number of rotations, or the like, and applies sensed or measured data to the controller 140. For example, when water is supplied or drained to or from the laundry treatment machine, the sensing device 170 may measure the level of the water, the temperature of the supplied water, and the rotation speed of the tub or drum.

The driver 180 controls driving of the home appliance 101 in response to a control signal from the controller 140 such that the home appliance 101 performs a set operation. For example, in the case of the laundry treatment machine, the driver 180 may drive a motor that rotates the tub or drum, and control the operation of the motor to wash soiled laundry through rotation of the tub or drum. Also, the driver 180 may control a valve in response to a control signal from the controller 140 to supply or drain water.

The memory 145 stores control data for control of the operation of the home appliance 101, and reference data used during control of the operation of the home appliance.

The memory 145 includes a data storage unit such as a read only memory (ROM) or electrically erasable programmable ROM (EEPROM) for storing control data for the home appliance. The storage device 146 is a buffer for the controller 140 that temporarily stores data. The storage device 146 may be, for example, a dynamic random access memory (DRAM) or static RAM (SRAM). As needed, the storage device 146 may be incorporated into the controller 140 or memory 145.

While the home appliance 101 performs a desired operation, the memory 145 stores operation information including operating state data generated during the operation and set data input by the manipulator 117 such that the home appliance 101 performs the desired operation, usage information including the number of occurrences of a specific operation in the home appliance 101 and model information of the home appliance 101, and fault information including information about the cause or position of a fault when the home appliance 101 malfunctions.

That is, the memory 145 stores product information including the operation information, the usage information and the fault information. The storage device 146 also stores temporary data about the operation information and fault information generated during the operation of the home appliance. For example, the product information may include the number of uses of the laundry treatment machine, a set course, option setting information, an error code, a value measured by a sensor, data calculated by the controller 140, and operation information of each component.

In the case of the laundry treatment machine, the operation information includes information necessary for the operation of the laundry treatment machine, such as information about the washing mode of the laundry treatment machine, information about the spin-drying mode of the laundry treatment machine and information about the rinsing mode of the laundry treatment machine.

The fault information may include, when the laundry treatment machine performs each operation, various information including fault information generated during each operation, device fault information of the laundry treatment machine, error codes corresponding to fault information, information of the controller 140, values sensed by the sensing device 170, sensed values of the motor, fault information of the wash water supply, and fault information of the drainage device.

The usage information may include various information including the number of uses of the laundry treatment machine by the user, a course set by the user, and option setting information set in the laundry treatment machine. That is, the usage information may include contents input to the laundry treatment machine by the user or information initially set in the laundry treatment machine.

The controller 140, when a signal for the smart diagnosis mode entry is input from the selector 130, fetches product information stored in the memory 145 or storage device 146, generates a digital signal of a predetermined format from the product information and applies the digital signal to the modulator 150. Also, as the selector 130 is manipulated, the controller 140 controls the sound output device 160 to operate it.

The controller 140 includes a main controller 141 for controlling a flow of data being input or output to or from the home appliance 101, generating and applying a control command based on data input from the sensing device 170, or providing sensed data to the driver 180 to control the driver 180 to operate the home appliance 101, and an encoder 142 for converting product information into a digital signal of a predetermined format in response to an input of the selector 130 such that a sound signal based on the digital signal is output.

The main controller 141, when the smart diagnosis mode is entered in response to the input of the selector 130, outputs a start sound indicating the start of the smart diagnosis mode through the sound output device 160 and displays predetermined data indicating the execution of the smart diagnosis mode through the display device 118.

Also, when a digital signal generated by the encoder 142 is applied to the modulator 150 and a sound signal is thus output through the sound output device 160, the main controller 141 controls the sound output device 160 to output a predetermined indication sound before and after the output of the sound signal. As needed, the indication sound may be omitted.

On the other hand, in the case where the sound output device 160 includes two or more sound output devices, the main controller 141 may control the sound output devices to output the indication sound and the sound signal including the product information through different ones of the sound output devices, respectively.

Upon entry of the smart diagnosis mode, the main controller 141 disables the manipulator 117 except for the selector 130 and a power key and controls the sensing device 170 and the driver 180 to make the home appliance 101 discontinue all other operations.

Also, when any one manipulating key of the manipulator 117 for setting of the operation of the home appliance 101 is input after power input, the main controller 141 does not start the smart diagnosis mode even though the selector 130 is input. Particularly, in the case where the selector 130 is not provided separately and an input of a combination of two or more of a plurality of manipulating keys of the manipulator 117 is recognized as the input of the selector 130, the main controller 141 starts the smart diagnosis mode only when the selector 130 is input by a specified key combination immediately without any other input after the input of the power key.

That is, the setting of the operation of the home appliance by the manipulator 117 is considered to indicate that the user has no intention of entering the smart diagnosis mode, and the main controller 141 thus does not enter the smart diagnosis mode. Also, it is possible to prevent the smart diagnosis mode from being entered unnecessarily due to a faulty manipulation of the manipulator 117.

The encoder 142 fetches the product information stored in the memory 145, encodes the product information according to a predetermined encoding scheme and adds a preamble and an error check bit to the resulting data signal, so as to generate a digital signal of a predetermined format. The encoder 142 generates a digital signal consisting of a plurality of symbols by encoding the product information.

In the course of generating the digital signal, the encoder 142 may divide the digital signal into a plurality of frames by a predetermined size and packetize the frames into a packet. Also, the encoder 142 may set an inter-frame space (IFS) between adjacent ones of the frames of the digital signal such that no sound signal is output for a predetermined time. Also, during signal conversion, the encoder may set a dead time in a symbol in a period in which a data value is changed, in order to eliminate reverberation that affects the next signal conversion due to the principle of charging and discharging of a capacitor.

Assuming that the length of each of the symbols constituting the digital signal is a symbol time and the fundamental length of a frequency signal constituting the sound signal from the sound output device 160, corresponding to each symbol, is also a symbol time, the encoder 142 may set a dead time within the symbol time with respect to one symbol. In this case, the length of the dead time varies with the length of the symbol time, The product information includes operation information including operation settings, operating state data, etc., usage information, and fault information about a faulty operation, as stated above. The product information is data consisting of a combination of 0s or 1s, which is a digital signal of a format readable by the controller 140.

The controller 140 generates a digital signal of a predetermined format by classifying data of the product information, incorporating specific data about the operation of the home appliance into the classified data and dividing the resulting data by a certain size or combining the resulting data, and applies the generated digital signal to the modulator 150.

Also, the controller 140 may change the number of symbols corresponding to output frequency signals according to the number of frequencies used in the modulator 150. In this case, the controller 140 changes the number of symbols of the digital signal corresponding to the number of frequency signals according to the number of frequencies used in the modulator 150. That is, in the case where the number of frequencies used is $2^n$, n symbols of the digital signal correspond to one frequency signal.

For example, the controller 140 may control the modulator 150 to convert one symbol of the digital signal into one frequency signal when the modulator 150 uses two frequencies to control the sound output device 160 to output a sound signal, two symbols of the digital signal into one frequency signal when using four frequencies, and three symbols of the digital signal into one frequency signal when using eight frequencies.

At this time, a symbol time may also be changed according to the number of symbols corresponding to one frequency signal.

The modulator 150 applies a drive signal to the sound output device 160 in response to the digital signal from the controller 140 such that the sound output device 160 outputs a sound signal. The sound signal output in this manner includes product information.

The modulator 150 applies the drive signal to the sound output device 160 such that a specified frequency signal corresponding to one of the symbols constituting the digital signal is output for a symbol time.

At this time, the modulator 150 performs a control operation such that the sound signal is output through a plurality of frequency bands in accordance with the digital signal while changing the number of symbols for each frequency signal based on the number of used frequencies in accordance with setting of the controller 140.

That is, as stated previously, one frequency signal may be output per symbol for a specified time when two frequencies are used, and one frequency signal may be output per 2 symbols for the specified time when four frequencies are used.

That is, when four frequencies are used, the modulator 150 controls the sound output device 160 in response to a control command from the controller 140 such that one frequency signal is output per two symbols of the digital signal, so that a sound signal consisting of a combination of a plurality of frequency signals is output. When eight frequencies are used, the modulator 150 performs a control operation such that one frequency signal is output per three symbols of the digital signal.

As a result, the frequency band and length of a sound signal output from the sound output device 160 are changed according to the number of frequencies used in the modulator 150. Whenever the number of frequencies used is doubled, the total length of a sound signal output (total sound signal output time) is reduced by ½.

That is, in the case where the modulator 150 controls the sound output device 160 using frequencies of a number corresponding to $2^n$, one frequency signal is output per n symbols of the digital signal and the length of a sound signal is reduced to $(½)^n$.

The modulator 150 includes frequency oscillators (not shown) for generating as many oscillation frequencies as the number of available frequencies and controls the sound output device 160 to output frequency signals from frequency oscillators that are specified in accordance with the digital signal.

The modulator 150 converts the digital signal from the controller 140 into the sound signal using one of frequency shift keying, amplitude shift keying, or phase shift keying while controlling the sound output device 160 to output the sound signal in accordance with the digital signal.

Frequency shift keying converts the digital signal into a signal having a frequency corresponding to a data value of the digital signal, amplitude shift keying converts the digital signal by changing the amplitude of the digital signal according to the data value, and phase shift keying converts the digital signal by changing the phase of the digital signal according to the data value.

Binary frequency shift keying (BFSK), which is a type of frequency shift keying, converts the digital signal into a signal of a first frequency when the digital signal has a data value of 0 and into a signal of a second frequency when it has a data value of 1. For instance, BFSK converts a data value 0 into a signal of a frequency of 2.6 KHz and converts a data value 1 into a signal of a frequency of 2.8 KHz, as will be described later with reference to FIG. 5.

Amplitude shift keying may convert the digital signal into a signal of a frequency of 2.6 KHz with an amplitude of 1 when the digital signal has a data value of 0 and an amplitude of 2 when it has a data value of 1.

While the modulator 150 has been described as using frequency shift keying as an example, the modulation scheme used may be changed. Also, the frequency bands used are merely an example and may be changed.

If a dead time is set in the digital signal, the modulator 150 discontinues modulation during an interval in which the dead time is set in the digital signal. The modulator 150 modulates the digital signal using pulse width modulation (PWM) and switches an oscillation frequency for modulation off during the interval, in which the dead time is set, to temporarily discontinue the frequency signal modulation during the dead time. This removes inter-symbol reverberation of the sound signal output from the sound output device 160.

The sound output device 160 is activated or deactivated according to a control command from the controller 140. The sound output device 160 emits a predetermined sound signal including product information by outputting a frequency signal corresponding to the digital signal for a specified time under the control of the modulator 160.

Here, one or more, preferably two or more, sound output devices 160 may be provided. For example, when two sound output devices are provided, one of the two sound output devices may output a sound signal including product information and the other may output an alarm sound or an effect sound corresponding to state information of the home appliance and may also output an indication sound before a smart diagnostic mode is entered or before the sound signal is output.

The sound output device 160 is deactivated after completely outputting the digital signal as the predetermined sound signal in accordance with the output of the modulator 150. When the selector 130 is manipulated again, the sound output device 160 is reactivated to output the predetermined sound signal carrying product information through the above-described process.

While a sound output unit such as a speaker or a buzzer may be used as the sound output device 160, a speaker having a wide reproduction frequency range is preferable in order to use a plurality of frequency bands.

When the smart diagnosis mode is entered, the sound output device 160 emits a start sound indicating the start of the smart diagnosis mode according to a control command from the main controller 141 and also outputs respective predetermined indication sounds at the start and end of outputting a sound signal carrying product information.

In response to a control command from the main controller 141, the display device 118 displays, on a screen, information such as information received from the selector 130 and the manipulator 117, operating state information of the home appliance 101, and information associated with completion of the operation of the home appliance 101. When the home appliance 101 operates abnormally, the display device 118 also displays fault information about the abnormality on the screen.

The display device 118 displays information indicating the smart diagnosis mode when the smart diagnosis mode has been started in response to a control command from the main controller 141. When the sound output device 160 outputs a sound signal, the display device 118 displays the progress of the sound output in the form of at least one of text, an image, and a numeral.

The home appliance 101 may include an output unit such as an illuminating or flickering lamp, a vibrator, or the like, which will not be described herein, in addition to the sound output device 160 and the display device 118.

The home appliance 101 with the above-stated configuration outputs a predetermined sound signal and delivers product information thereof to the service center 200 in the following manner.

When product information of the laundry treatment machine 101 is output in the form of a sound signal and then transmitted to the service center 200 over the telephone network, it is input to the diagnostic server provided in the service center 200, so that the diagnostic server performs a fault diagnosis of the laundry treatment machine 101 based on the product information.

The diagnostic server includes a communicator (not shown), a signal processor (not shown), a data device (not shown), an input/output device (not shown), a diagnoser (not shown), and a server controller (not shown) for controlling the entire operation of the diagnostic server.

The input/output device includes input units such as buttons, keys, a touchpad or a switch that the user of the service center 200 manipulates, and a display for displaying operating information and diagnosis results of the diagnostic server. The input/output device also includes a connection interface for interfacing with an external input device and a portable memory. When a specific input unit of the input/output device is manipulated, the input/output device applies a signal to the server controller to allow the diagnostic server to receive a sound signal from the laundry treatment machine 101 through the telephone or mobile phone of the user connected to the diagnostic server over the telephone network or mobile network.

The communicator is connected to an internal network of the service center 200 and transmits and receives data to and from the network. The communicator is also connected to an external network such as the Internet to communicate with the external network. Especially upon receipt of a recording command or a reception command through manipulation of an input unit of the input/output device, the communicator receives sound signal data over the telephone network and transmits a diagnosis result externally, according to a control command from the server controller.

The data device stores control data for controlling the operation of the diagnostic server, a sound signal received from the home appliance such as the laundry treatment machine in the form of sound signal data, reference data for detection of product information of the home appliance, and fault diagnostic data for diagnosing whether the home appliance is out of order and the cause of a fault. The data device also stores a digital signal extracted from the sound signal and product information extracted from the digital signal. The data device receives, manages and updates data under the control of the server controller.

The signal processor performs signal conversion for the received sound signal to extract a digital signal therefrom, extracts product information from the digital signal and stores the product information in the data device. The signal conversion is the reverse of signal conversion in the home appliance 101. Preferably, each home appliance and the diagnostic server convert data using the same scheme preset by agreement therebetween.

The signal processor converts a sound signal consisting of certain frequency signals into a digital signal through demodulation using one of frequency shift keying, amplitude shift keying or phase shift keying. The signal processor first detects a preamble indicative of the start of data from the received sound signal, extracts a digital signal including product information from the sound signal based on the detected preamble, and decodes the digital signal according to a predetermined decoding scheme to extract the product information therefrom.

The diagnoser determines the state and fault of the home appliance 101 using the product information, analyzes the cause of the fault and outputs a diagnosis result including a countermeasure against the fault based on a result of the analysis.

The server controller controls transmission and reception of data through the communicator and flow of data through the input/output device. In addition, the server controller controls the operations of the signal processor and the diagnoser such that the signal processor processes the sound signal including the product information of the home appliance 101 and the diagnoser performs the fault diagnosis. The server controller also performs a control operation such that the diagnosis result of the diagnoser is output through the input/output device or is transmitted through the communicator.

Figure 4:
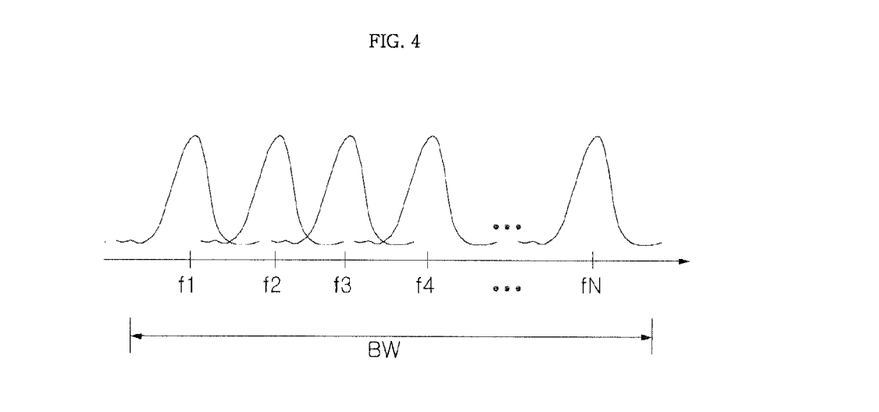
FIG. 4 is a waveform diagram illustrating types of frequencies output from a sound output device in the home appliance of FIG. 3.

Next, a description will be given of an example of conversion of product information into a sound signal by the modulator 150 of the home appliance 101. FIG. 4 is a waveform diagram illustrating types of frequencies output from the sound output device in the home appliance of FIG. 3.

The modulator 150 controls the operation of the sound output device 160 through modulation of a digital signal based on a plurality of frequencies f1 to fN such that a sound signal having a combination of the plurality of frequencies is output, as shown in FIG. 4.

At this time, the number of symbols corresponding to one frequency signal is changed depending on the number of frequencies used, and the length of a sound signal output is changed accordingly. Here, a time taken for one frequency signal to be output is determined in consideration of a minimum time required for one frequency signal to be output as a sound signal through the sound output device 160, a time taken for one frequency signal to be recognized as a sound signal by the portable terminal 81, and sampling in the portable terminal 81.

Owing to the use of the plurality of frequencies, the modulator 150 includes frequency oscillators of a number corresponding to the number of the frequencies used, and controls the sound output device 160 to output specified frequency signals corresponding to the digital signal.

Here, the plurality of frequencies used are selected such that they have a frequency separation of a certain band or more therebetween to prevent inter-frequency interference. Also, the plurality of frequencies used are selected such that a bandwidth BW thereof is within the range of a reproducible frequency band of the sound output device 160.

Figure 5:
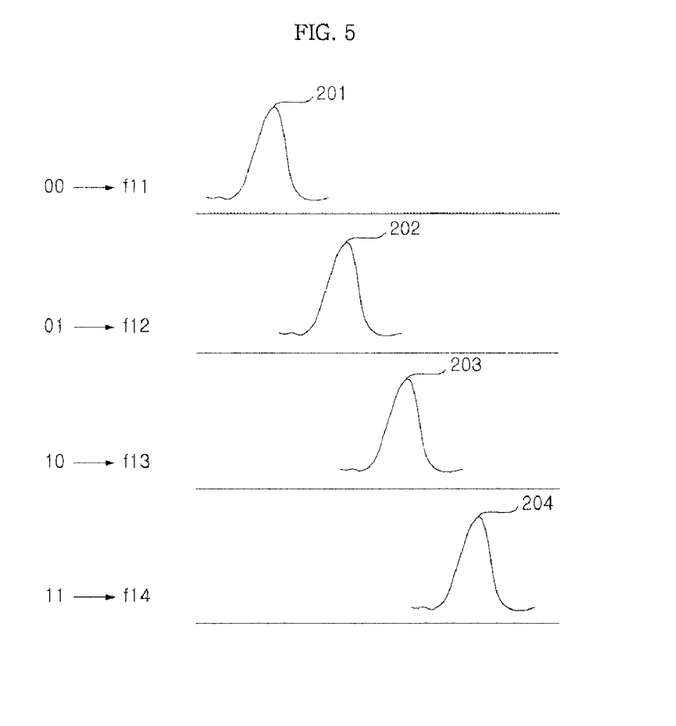
FIG. 5 is a waveform diagram illustrating an example of conversion of data into signals of a plurality of frequencies in a home appliance of the present invention.

FIG. 5 is a waveform diagram illustrating an example of conversion of data into signals of a plurality of frequencies in a home appliance of the present invention. Referring to FIG. 5, when four frequencies are used in the modulator 150, a corresponding frequency signal is output per 2 bits of a digital signal.

The modulator 150 outputs, through the sound output device 160, a first frequency f11 201 when the digital signal is '00', a second frequency f12 202 when '01', a third frequency f13 203 when '10', and a fourth frequency f14 204 when '11'.

In this case, the modulator 150 includes frequency oscillators for generating the first to fourth frequencies, respectively, and generates a synchronous signal to each frequency oscillator, so that a corresponding frequency signal is output per 2 bits of a digital signal from the controller 140 to the sound output device 160.

Figure 6:
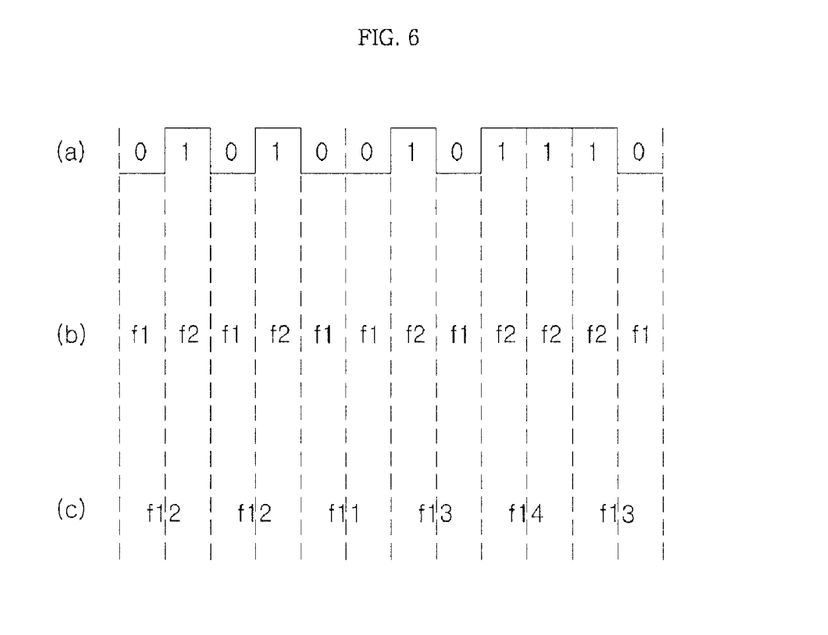
FIG. 6 is a waveform diagram illustrating an example of signal conversion using the frequencies of FIG. 5.
Figure 7:
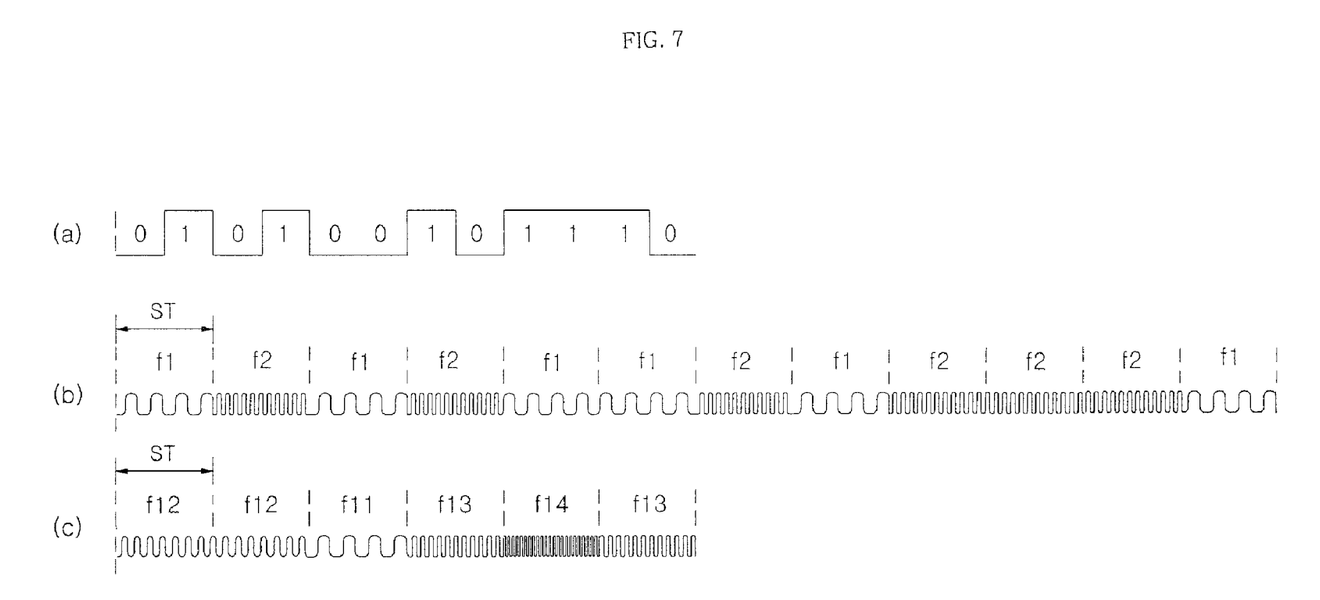
FIG. 7 is a waveform diagram illustrating the signal conversion of FIG. 6.

FIG. 6 is a waveform diagram illustrating an example of signal conversion using the frequencies of FIG. 5, and FIG. 7 is a waveform diagram illustrating the signal conversion of FIG. 6. Referring to FIG. 6, the home appliance 101 outputs a sound signal through the sound output device 160 using the first to fourth frequencies f11 to f14, as shown in FIG. 5. FIG. 6(*a*) shows an example of the digital signal, FIG. 6(*b*) shows an example of signal conversion in use of two frequencies, and FIG. 6(*c*) shows an example of signal conversion in use of four frequencies.

In the case where the digital signal is '010100101110' as shown in FIG. 6(*a*) and two frequencies are used, the modulator 150 outputs a frequency 1 f1 for 0 of the digital signal and a frequency 2 f2 for 1 of the digital signal. As a result, a frequency signal combination as shown in FIG. 6(*b*) is output as a sound signal through the sound output device 160.

In the case where the first to fourth frequencies f11 to f14 are used as stated above with reference to FIG. 5, two symbols of the digital signal are converted into one frequency signal and the converted frequency signal is output as a sound signal. Accordingly, the modulator 150 outputs, through the sound output device 160, the first frequency f11 for 00 of the digital signal, the second frequency f12 for 01, the third frequency f13 for 10, and the fourth frequency f14 for 11. Consequently, the respective frequencies f12, f12, f11, f13, f14 and f13 corresponding to the digital signal of FIG. 6(*a*) are output through the sound output device 160, as shown in FIG. 6(*c*).

Although FIG. 6 represents a frequency corresponding to a bit of each symbol of the digital signal for convenience of description, the length of an actually output sound signal varies depending on the number of frequencies used. That is, one symbol, one bit, corresponds to one frequency signal in FIG. 6(*b*), whereas two symbols, two bits, correspond to one frequency signal in FIG. 6(*c*).

That is, in the case of FIG. 6(*b*) using the two frequencies, a total of 12 frequency signals each having a certain length, corresponding to a digital signal consisting of 12 symbols, are output as a sound signal, and, in the case of FIG. 6(*c*) using the four frequencies, a total of 6 frequency signals each having a certain length, corresponding to the digital signal, are output as the sound signal.

In the case where the sound signal corresponding to the digital signal is output using the plurality of frequencies as shown in FIG. 6, it is output through the sound output device 160 as shown in FIG. 7. FIG. 7 shows waveforms of the frequency signals of FIG. 6.

Referring to FIG. 7, because one frequency signal is output per 2 symbols (2 bits) of a digital signal when four frequencies are used, the digital signal of FIG. 7(*a*) is modulated into a frequency signal combination as shown in FIG. 7(*c*), which is then output as a sound signal through the sound output device 160.

When the sound signal is provided with six frequency signals by employing four frequencies with respect to the same digital signal as shown in FIG. 7(*c*), it has a shorter length than that when provided with twelve frequency signals by employing two frequencies with respect to the same digital signal as shown in FIG. 7(*b*). Because a time taken for one frequency signal to be output is constant, the length of the sound signal output from the sound output device 160 in the case of FIG. 6(*b*) is increased to twice that in the case of FIG. 6(*c*), and the output time thereof is thus increased to twice that in the case of FIG. 6(*c*).

That is, because each frequency signal is output through the sound output device 160 for a specified output time ST, the length of the sound signal when four frequencies are used is reduced to ½ that when two frequencies are used.

Here, an output time ST taken for one frequency signal to be output is set in consideration of at least one of a minimum time required for one frequency signal to be output as a sound signal through the sound output device 160, a time taken for one frequency signal to be input, recognized and output as a sound signal by the portable terminal 81 for transmission through the portable terminal 81, a sampling time in the portable terminal 81, a noise recognition time in the portable terminal 81, and a transmission rate in transmission over the communication network.

Preferably, the output time ST may be set to a certain value or more such that the diagnostic server of the service center can accurately perform data conversion in a process of recognizing and analyzing a sound signal.

That is, when the output time ST of one frequency signal is short, the frequency signal may not be output as a sound signal through the sound output device 160, may not be recognized as a sound signal by the portable terminal 81 or may be distorted when sampled by the portable terminal 81, so as not to be recognized by the diagnostic server. Also, the frequency signal may be recognized by the portable terminal 81, not as a sound signal from the home appliance, but as noise, or may be accompanied by an error or noise during transmission over the communication network. Also, when the output time ST of one frequency signal is long, the total length of a sound signal is increased. In this context, it is preferable to set the output time ST in consideration of all the above conditions.

For these reasons, it is preferable that the output time of one frequency signal be set within the range of 3 ms to 30 ms. It is preferable that the number of pulses included in one frequency signal be set to 8 or more. FIG. schematically illustrates a comparison between output sound signals based on the number of frequencies.

Figure 8:
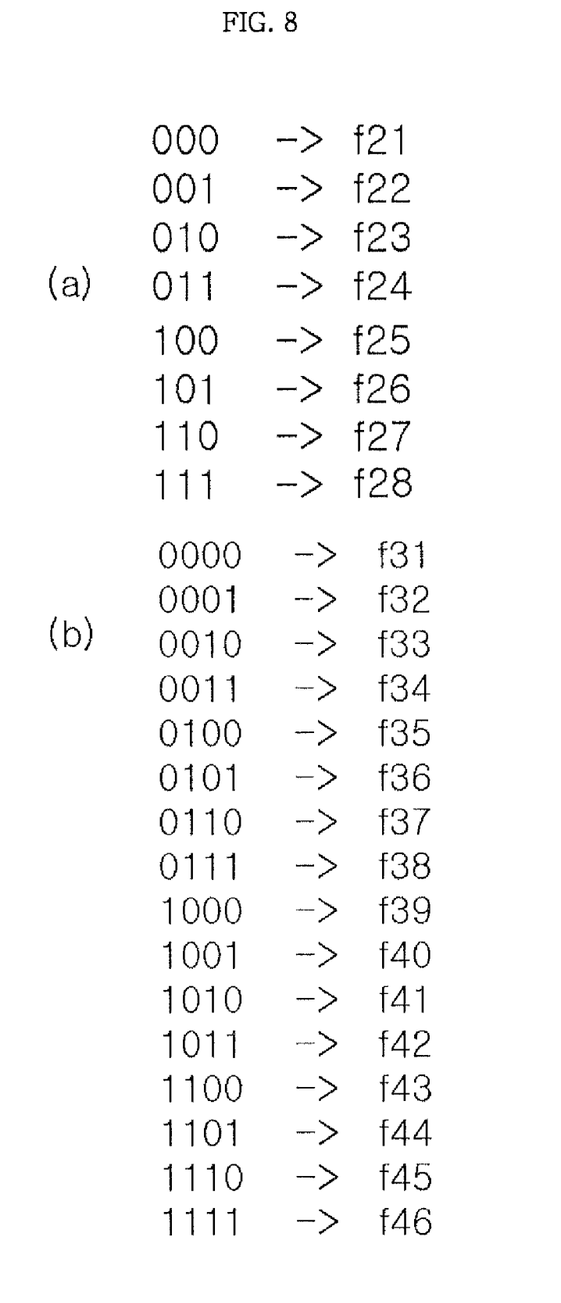
FIG. 8 is a view illustrating another example of signal conversion using a plurality of frequencies in the home appliance of the present invention.

FIG. 8 illustrates another example of signal conversion using a plurality of frequencies.

Referring to FIG. 8, 8 or more frequencies may be used to output a sound signal. For example, in order to output a sound signal including product information, the modulator 150 may use 8 frequencies as shown in FIG. 8(*a*) or 16 frequencies as shown in FIG. 8(*b*).

When 8 frequencies are used as shown in FIG. 8(*a*), one frequency signal corresponding to three symbols (3 bits) of a digital signal is output.

As a result, the modulator 150 applies a corresponding frequency signal per three symbols (3 bits) of the digital signal to the sound output device 160 such that the frequency signal is output as a sound signal for a specified time.

For example, the modulator 150 may output a frequency 21 f21 for 000 of the digital signal, a frequency 22 f22 for 001, a frequency 23 f23 for 010, a frequency 24 f24 for 011, a frequency 25 f25 for 100, a frequency 26 f26 for 101, a frequency 27 f27 for 110, and a frequency 28 f28 for 111.

The modulator 150 outputs a specified frequency signal, corresponding to the digital signal as stated above, through the sound output device 160 for a specified output time ST.

For example, in the case where a digital signal consisting of 120 symbols is modulated into a sound signal using eight frequencies, one frequency signal is output per 3 symbols and a total of 40 frequency signals corresponding to the digital signal are thus output as the sound signal.

When an output time ST taken for one frequency signal to be output is 12 ms, the total sound signal output time is 480 ms because 40 frequency signals are generated for 120 symbols. In the case of a digital signal consisting of 240 symbols, the total sound signal output time is 960 ms.

When 16 frequencies are used as shown in FIG. 8(*b*), one frequency signal corresponding to four symbols is output as a sound signal.

For example, a frequency 31 f31 corresponding to 0000 of the digital signal, a frequency 32 f32 corresponding to 0001, a frequency 33 f33 corresponding to 0010, a frequency 34 f34 corresponding to 0011, a frequency 35 f35 corresponding to 0100, a frequency 36 f36 corresponding to 0101, a frequency 37 f37 corresponding to 0110, and a frequency 38 f38 corresponding to 0111 may be each output through the sound output device 160 for a specified output time ST.

Also, a frequency 39 f39 corresponding to 1000 of the digital signal, a frequency 40 f40 corresponding to 1001, a frequency 41 f41 corresponding to 1010, a frequency 42 f42 corresponding to 1011, a frequency 43 f43 corresponding to 1100, a frequency 44 f44 corresponding to 1101, a frequency 45 f45 corresponding to 1110, and a frequency 46 f46 corresponding to 1111 may be each output through the sound output device 160 for the specified output time ST.

In this case, when the digital signal consists of 120 symbols, 4 symbols are converted into one frequency signal and a total of 30 frequency signals corresponding to the digital signal are thus output as a sound signal. As a result, when an output time ST taken for one frequency signal to be output is 12 ms, the total sound signal output time of the digital signal of 120 symbols is 360 ms. In the case of a digital signal consisting of 240 symbols, the total sound signal output time is 720 ms.

Figure 9:
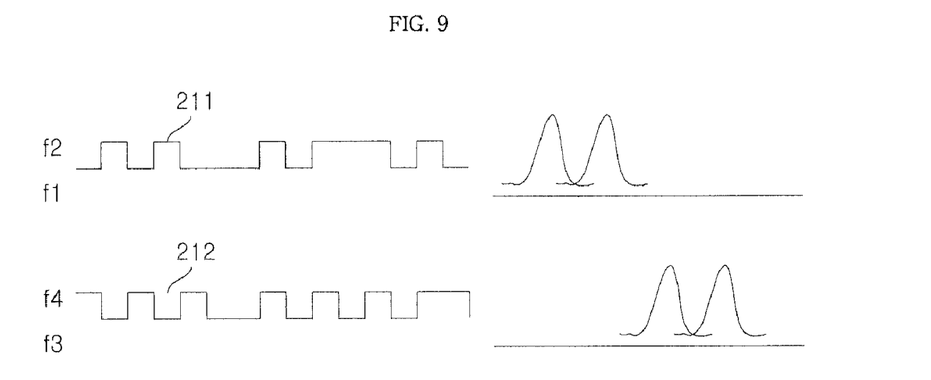
FIG. 9 is a waveform diagram illustrating another example of data to frequency conversion in the home appliance of the present invention.
Figure 10:
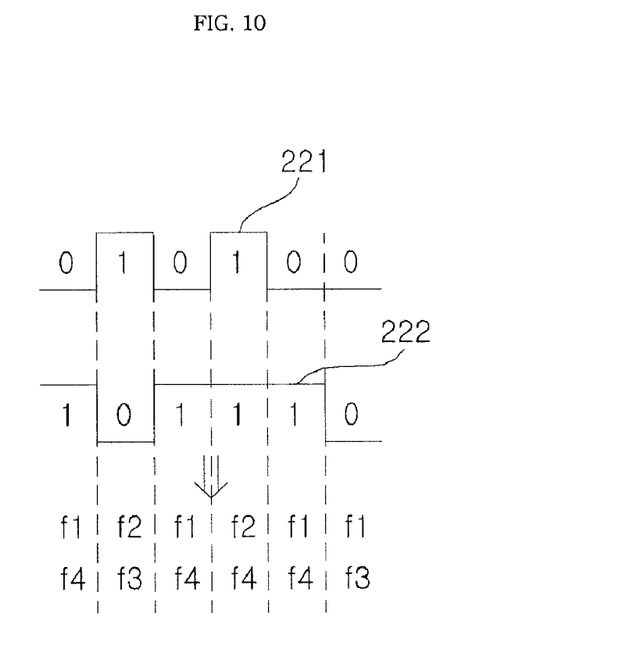
FIG. 10 is a waveform diagram illustrating an example of a signal conversion based on the frequency conversion of FIG. 9.

FIG. 9 is a waveform diagram illustrating another example of data to frequency conversion in the home appliance of the present invention, and FIG. 10 is a waveform diagram illustrating an example of a signal conversion based on the frequency conversion of FIG. 9.

Referring to FIG. 9, when the modulator controls the sound output device to output a sound signal, it uses four frequencies and outputs one or more thereof simultaneously.

For example, in the case of a digital signal consisting of 2 symbols (2 bits), a frequency 1 f1 and a frequency 2 f2 are used for the first symbol such that the frequency 1 f1 is output for 0 and the frequency 2 f2 is output for 1, and a frequency 3 f3 and a frequency 4 f4 are used for the second symbol such that the frequency 3 f3 is output for 0 and the frequency 4 f4 is output for 1. Preferably, the frequencies 1 and 2 and the frequencies 3 and 4 may belong to such bands that they can be readily identified even though output simultaneously.

As shown in FIG. 10, in the case where the digital signal is 011001110100, the frequency 1 f1 and the frequency 4 f4 are output for 01 on a 2-symbol basis because the first symbol is 0 and the second symbol is 1. Therefore, the frequencies 1 and 4 are output at the same time.

That is, when 011001110100 are divided 2 bits by 2 bits and each of 01, 10, 01, 11, 01 and 00 is expressed by the frequencies 1 and 2 and the frequencies 3 and 4, frequency signals can be output as shown in FIG. 10.

As is apparent from the above description, in a home appliance and a signal output method thereof according to the present invention, a digital signal including product information of the home appliance is converted into a sound signal based on a plurality of frequency signals. As a result, the length of the sound signal including the product information is reduced, thereby reducing a time taken to output the sound signal, and a data transmission time and a transmission data size in transmission of the sound signal. Therefore, a larger amount of data can be transmitted within the same time, so that detailed data necessary for a diagnosis can be transmitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home appliance comprising:
a selector for inputting a command for execution of a fault diagnosis of the home appliance;
a memory for storing product information of the home appliance for the fault diagnosis;
a controller for, when the fault diagnosis execution command is input by the selector, changing an operating mode of the home appliance to a smart diagnosis mode and encoding the product information stored in the memory to generate a digital signal including at least one frame;
a modulator for modulating the digital signal using a plurality of frequencies such that any one of signals of the frequencies corresponds to at least one bit of the digital signal; and
a sound output device for outputting a sound signal corresponding to the frequency signals applied from the modulator.

2. The home appliance according to claim 1, wherein the controller controls the modulator such that the number of bits of the digital signal corresponding to one frequency signal is changed according to the number of the frequencies used in the modulator.

3. The home appliance according to claim 2, wherein the modulator applies one of the frequency signals corresponding to a logic value of the digital signal to the sound output device for a predetermined output time according to the number of the bits of the digital signal corresponding to the one frequency signal.

4. The home appliance according to claim 3, wherein the modulator outputs the corresponding frequency signal per 2 bits of the digital signal through the sound output device using four frequencies.

5. The home appliance according to claim 3, wherein the modulator outputs the corresponding frequency signal per 3 bits of the digital signal through the sound output device using eight frequencies.

6. The home appliance according to claim 3, wherein the modulator outputs the corresponding frequency signal per 4 bits of the digital signal through the sound output device using sixteen frequencies.

7. The home appliance according to claim 3, wherein the modulator outputs the corresponding frequency signal per n bits of the digital signal through the sound output device using frequencies of a number corresponding to $2^n$.

8. The home appliance according to claim 2, wherein the modulator includes frequency oscillators for generating frequency signals of a number corresponding to the number of the frequencies used, the modulator controlling the sound output device to output the frequency signal from a specified one of the frequency oscillators corresponding to the logic value of the digital signal through the sound output device for the output time.

9. The home appliance according to claim 7, wherein the sound output device is a speaker.

* * * * *